United States Patent [19]
Brown et al.

[11] Patent Number: 5,894,029
[45] Date of Patent: Apr. 13, 1999

[54] METHOD OF MAKING PET SNACK FOOD

[75] Inventors: Bruce W. Brown; Pamela N. Coe, both of Medina, Tex.

[73] Assignee: Purebred Pet Products, Inc., Dallas, Tex.

[21] Appl. No.: 08/880,652

[22] Filed: Jun. 23, 1997

Related U.S. Application Data

[60] Continuation of application No. 08/636,888, Apr. 24, 1996, abandoned, which is a division of application No. 08/216,136, Mar. 21, 1994, abandoned.

[51] Int. Cl.$^6$ .................................................. A23K 1/18
[52] U.S. Cl. ........................ 426/302; 426/559; 426/635; 426/805
[58] Field of Search ........................... 426/302, 303, 426/805, 93, 94, 72, 74, 559, 623, 625, 635, 636

[56] References Cited

U.S. PATENT DOCUMENTS

| | | | |
|---|---|---|---|
| 3,119,691 | 1/1964 | Ludington | 426/2 |
| 3,284,211 | 11/1966 | Williams | 426/805 |
| 3,467,525 | 9/1969 | Habe | 426/805 |
| 3,665,998 | 5/1972 | Acefo | 426/518 |
| 3,754,961 | 8/1973 | Ueno | 426/307 |
| 3,808,340 | 4/1974 | Palmer | 426/305 |
| 3,882,255 | 5/1975 | Gorham | 426/305 |
| 4,000,319 | 12/1976 | Eichelberg | 426/805 |
| 4,039,687 | 8/1977 | Weyn | 426/805 |
| 4,104,407 | 8/1978 | Stringes | 426/805 |
| 4,143,169 | 3/1979 | Skoch | 426/307 |
| 4,145,447 | 3/1979 | Fisher | 426/805 |
| 4,162,336 | 7/1979 | Brown | 426/623 |
| 4,229,485 | 10/1980 | Brown | 426/805 |
| 4,410,551 | 10/1983 | Comel | 426/307 |
| 4,454,804 | 6/1984 | McCulloch | 99/348 |
| 4,592,913 | 6/1986 | Hara | 426/656 |
| 4,659,583 | 4/1987 | Hashimoto | 426/658 |
| 4,713,250 | 12/1987 | Tonyes | 426/805 |
| 4,735,812 | 4/1988 | Bryson | 426/656 |
| 5,071,665 | 12/1991 | Buckley | 426/646 |

OTHER PUBLICATIONS

Jecsai, Jolan et al., "Amino Acid Composition and Biological Value of Various Animal–Product Foods", Allattenyesztes (1968), 17 (4), English Abstract Only (AN 1969:490121 CAPLUS).

Samant S.K. et al., "Cyclodextrins: New Versatile Food Additive", Indian Food Packer, (1991) 45(3) English Abstract Only (AN 92(10):10023 FSTA).

Anonymous, "King of the Ring", Food Manufacture (1989) 64(2) English Abstract Only (AN 89(09):T0001 FSTA).

Rao, N.M., "Importance of Rendering and Evaluation of Rendered Products in Animal Feed Industry", Livestock Adviser, (1985) vol. 10, No. 11, English Abstract Only (AN 86:14211 CABA).

Allegre, M. et al., "Cyclodextrin Uses: From Concept to Industrial Reality", Agroc. Food Industry Hi–Tech, (1994) 5(1), English Abstract Only (AN 94(06): A0019 FSTA.

*Primary Examiner*—Daniel Stemmer
*Attorney, Agent, or Firm*—Laurence R. Brown

[57] ABSTRACT

A dried, puffed pat food composed of farinaceous and proteinaceous materials and flavoring ingredients,, such as seasonings, smoke flavoring, and spices; and additives; such as, cyclodextrin, emulsifiers, preservatives, trace minerals, vitamins, and optionally medications, nutrients, and supplements as an inner puffed core matrix encapsulated within an outer shell composed of flavoring ingredients; such as, smoke flavoring, spices and seasonings; and additives; such as, cyclodextrin, vitamins, and optionally medications, nutrients, and supplements is disclosed. This pet food is low fat, low cholesterol and low calorie and provides a healthy, nutritional pat snack.

6 Claims, 1 Drawing Sheet

METHOD OF MAKING PET SNACK FOOD

This application is a continuation of application Ser. No. 08/636,888, filed Apr. 24, 1996, now abandoned which is a division of Ser. No. 08/216,136, filed Mar. 21, 1994, now abandoned.

BACKGROUND OF THE INVENTION

The field of art to which the invention pertains includes the field of edible material, particularly a pet snack food in the form of animal-shaped and bone-shaped biscuits, cookies or kibbles.

Dog and cat foods are generally prepared as either meal-type rations or canned-type rations. Such foods are generally formulated from a combination of proteinaceous and farinaceous materials. The proteinaceous material is derived from either vegetable protein sources or from meat and/or meat by-product sources, and nutritional supplements are often added. The farinaceous material is derived from grain products and contains starch as a major component. The meal-type pet foods have a hard, dry, cereal-like texture and low moisture content, typically about 10%. This hard textured product is difficult for older dogs and cats to eat. Typically these foods are high in both nutritional value and caloric value. Some pet owners are concerned that their pets are eating too many high calorie foods and snacks. These pet owners have been searching for an alternative snack food which provides their pets with a highly nutritional, low calorie, low fat and low cholesterol snack.

SUMMARY OF THE INVENTION

The present invention provides a highly palatable, flavorful pet food snack which is low calorie, low fat, low cholesterol and highly nutritional. Further, the present invention also provides a method of making such pet food snack. The pet food snack of the present invention is a dry, light, puffed corn snack heretofore not available as a pet food snack.

The present invention provides a pet food snack which can be shaped into novel animal and bone shapes which are appealing to the eye of the purchaser, easy to handle and easy to measure.

Further, the present invention provides a pet food snack which is not hard and may be enjoyed by older pets no longer having strong, healthy teeth.

Further still, the unique combination of ingredients of the pet food snack of the present invention allows the preservation of flavor for long time periods, i.e., more than 5 years. As a result of the unique combination of ingredients, the snack may be stored in sealed containers and packages without refrigeration for more than 5 years.

The pet food snack of the present invention provides an excellent vehicle or carrier for administering medications, vitamins, nutrients and any other supplements of disagreeable taste, texture, consistency or the like which may be difficult to administer to pets.

The present invention relates to a highly palatable, novel pet food snack and a process for preparing the same. Generally, the pat food snack of the present invention comprises mainly a farinaceous puffed core matrix with minor proportions of proteinaceous material and of flavoring ingredients and additives which is encapsulated by a coating of flavoring ingredients and additives. This pet food snack is prepared by combining a mixture of farinaceous materials; proteinaceous materials, such as, collagen; spices; seasonings; emulsifiers; cyclodextrin; preservatives; trace minerals and vitamins; and optionally, medications, nutrients, supplements or any other compound or composition which a person would administer to a pet. The mixture is extruded as a dough mixture through an extruder. As a result of the extrusion process, this mixture is heated under pressure resulting in the binding together and puffing of the particles in the mixture. The puffed extruded product is then shaped by rotating knives to produce unique shapes, i.e., animal and bone shapes. Within several minutes, as the product cools off, the percentage of moisture in the extruded dough mixture drops to a lower percentage by weight in the shaped and cooling core matrix. The extruded product is then coated by an electrostatic coating process which deposits a predetermined amount of spices, seasonings, vitamins, cyclodextrin, and optionally, medications, additional nutrients or supplements, resulting in the encapsulation of the matrix without the addition of oil or sugar water. The encapsulation process is aided by the cooling of the product. As the product cools, the product itself creates a vacuum, thus pulling the spices, seasonings, cyclodextrin and other additives onto its surface. The product is then completely cooled to room temperature and packaged in sealed containers and packages.

DETAILED DESCRIPTION OF THE PREFERRED EMBODIMENT

Figure 1:
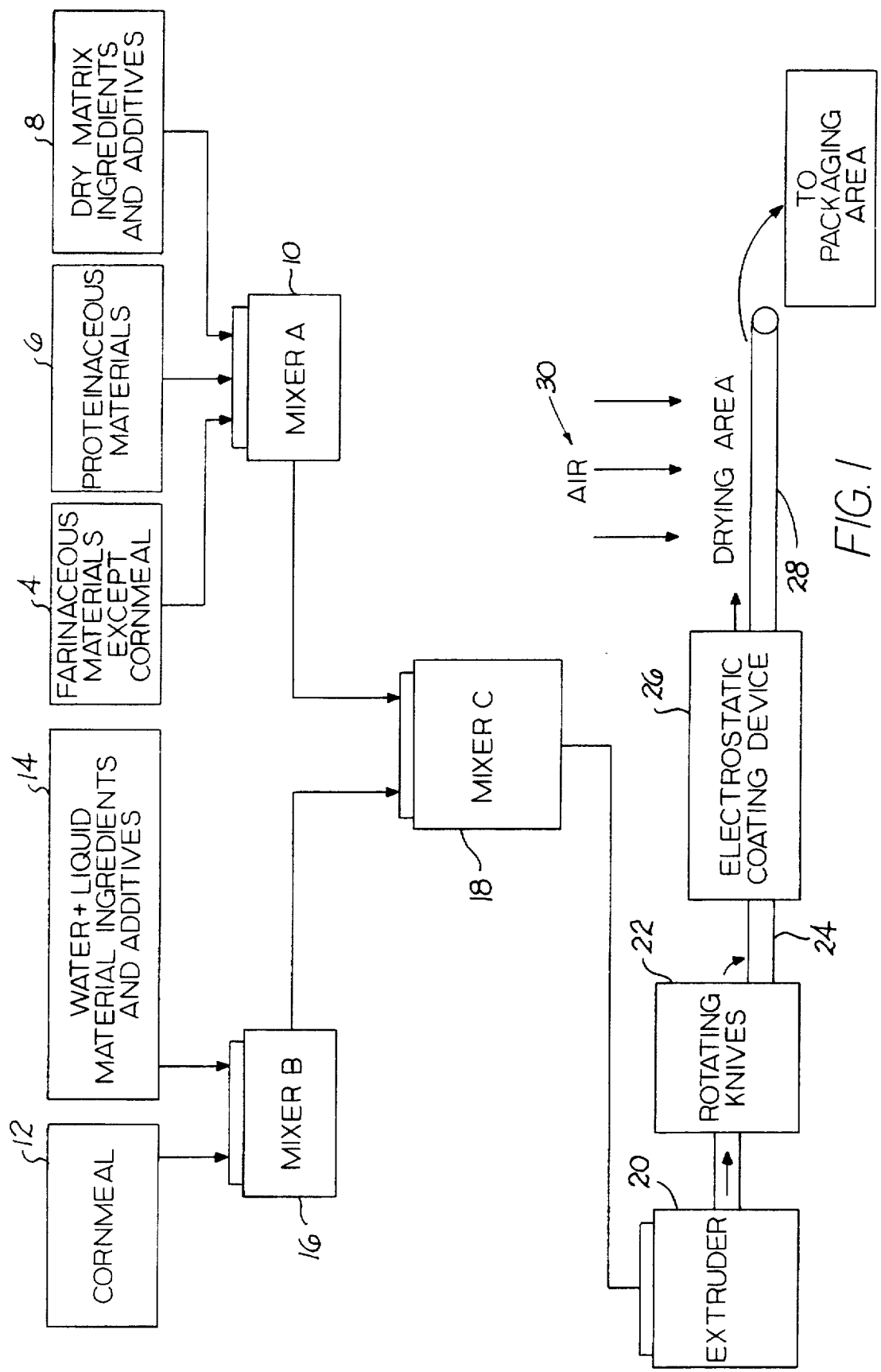
FIG. 1 is a diagrammatic view of a preferred method and apparatus for making the pet food snack of the present invention.

The pet food snack of the present invention is predominantly composed of farinaceous material. Farinaceous materials in accordance with this invention are materials rich in starch and/or starch-like material. Examples are cereal grains, meals or flours obtained from grinding cereal grains, such as, corn, oats, wheat, sorghum, milo, barley, rice and legumes, as well as various milling by-products of such cereal grains. For example, such by-products are wheat shorts, oat groat, hominy feed, wheat feed flour, wheat middlings, wheat mixed feed, and any other such material. Also included as sources of farinaceous ingredients are the tuberous foodstuffs, such as potatoes, tapioca or the like. Additionally xanthan gum, a polysaccharide gum produced by the bacterium *Xanthomonas campestrise*, is considered to be a farinaceous material according to the present invention. The role of the farinaceous material is to serve as an adhesive or binder for the dough and to enhance the elasticity of the resulting mixture.

The preferred finished product of the present invention is a pet food snack in the form of dry, puffed pieces. Each piece is composed of a puffed core matrix made of at least approximately 70% farinaceous material by weight of the snack, at least approximately 0.40% proteinaceous material by weight of the snack, at least approximately 0.40% matrix flavoring ingredients and matrix additives by weight of the snack and at east approximately 6–8% moisture content by weight of the snack. This puffed core matrix is encapsulated by coating the matrix with coating flavoring ingredients and coating additives. The coating constitutes at least approximately 0.40% by weight of the snack. The coated puffed core matrix is the pat food snack of the present invention.

The farinaceous material used to make the puffed core matrix is selected from corn meal, wheat grits, bulgur wheat, wheat gluten, potato flour, peanut meal, chick pea meal, garbanzo bean meal, xanthan gum, rice flour, white sorghum flour, other comparable grain byproducts, flours and meals or combinations of these different materials. The farinaceous material constitutes from approximately 70–98.5% by weight of the snack.

Corn meal is the predominant farinaceous material used to make the puffed core matrix. Preferably, yellow corn meal is used. Corn meal constitutes from approximately 70–79% by weight of the finished snack. The presence of the corn meal results in the puffing of the core matrix. Rice flour can be substituted for a portion of the corn meal to aid in the puffing of the core matrix. If rice flour is used than it should constitute approximately 0.4–2.8% by weight of the finished snack. Other known farinaceous materials whose presence results in puffing of the core matrix may also be used as a substitute for a portion of the corn meal.

The remaining farinaceous materials constitute from approximately 0.4–18% by weight of the finished snack. One or more of the following farinaceous materials can be selected to make the puffed core matrix: bulgur wheat, potato flour, white sorghum flour, wheat grits, wheat gluten, peanut meal, chick pea meal, garbanzo bean meal, xanthan gum or other comparable grain by-products, flours and meals.

If bulgur wheat or potato flour is used to make the puffed core matrix then this material should constitute approximately 4.5–14% by weight of the finished snack.

If white sorghum flour is used to make the puffed core matrix then this material should constitute approximately 4.5–7.5% by weight of the finished snack.

If peanut meal, chick pea meal, or garbanzo bean meal is used to make the puffed core matrix then these meals should constitute approximately 0.9–4.7% by weight of the snack.

If wheat grits is used to make the puffed core matrix then these materials should constitute approximately 1.9–4.7% by weight of the snack.

If wheat gluten is used to make the puffed core matrix then these materials should constitute approximately 0.9–1.9% by weight of the snack.

If xanthan gum is used to make the puffed core matrix then the gum should constitute from approximately 0.4–2.8% by weight of the snack.

Proteinaceous materials in accordance with the present invention are beef hide, also known as rawhide, and bone meal or hoof meal. The source of the bone meal or hoof meal can be from any number of animals, such as cattle, swine, sheep, goats, horses, poultry or the like. It is believed that the important component of the proteinaceous material used to make the pet food snack of the present invention is collagen. Collagen is an insoluble fibrous protein which is the chief constituent of vertebrate connective tissue fibrils and bones and yields gelatin and glue on prolonged heating with water. Thus, the collagen component of the beef hide and bone meal or hoof meal provides a source of protein as well as an adhesive and a binder.

The beef hide and bone meal or hoof meal used in the present invention is prepared by grinding or pulverizing the beef hide or bone or hoof into a finely divided state. This finely ground preparation is mixed with the other dry ingredients used to make the core matrix. The ground beef hide or bone meal or hoof meal prepared according to the present invention constitutes from approximately 0.4–4.7% by weight of the snack. Preferably, the ground beef hide or bone meal or hoof meal is approximately 1% by weight of the pet food snack.

The core matrix also contains matrix flavoring ingredients, such as; smoke flavoring, seasonings and spices. A source of the smoke flavoring is from a commercially available product, containing concentrated smoke in water. The spices and seasonings include but are not limited to whey, powdered milk, powdered anise, salt, peanut meal, garlic, powdered citrus pulp and sugar.

The core matrix also contains matrix additives, such as, cyclodextrin, emulsifiers, preservatives, trace minerals and vitamins and may optionally contain matrix additives, such as, medications, nutrients or any other type of supplements which a pet owner may wish to administer to his pet. The combined matrix ingredients and additives constitute from approximately 0.4–5% by weight of the snack.

Cyclodextrin's use in the pet food snack of the present invention is believed to be unique in that this compound has not heretofore been used in pet foods. Cyclodextrin is used in the core matrix to selectively absorb aromatic compounds, retain these compounds and then release them in a controlled manner. Thus, it is believed that cyclodextrin retains and then releases the flavor ingredients from the core matrix. This property would also aid in extending the shelf life of the pet food snack of the present invention by allowing the flavor ingredients to be maintained for longer periods of time than a product without cyclodextrin.

Cyclodextrins are produced by a highly selective enzymatic synthesis. They consist of six, seven or eight glucose monomers arranged in a donut shaped ring, which are designated alpha, beta and gamma cyclodextrin, respectively. The internal cavity of the cyclodextrins is hydrophobic in nature and is a key structural feature of the cyclodextrins for providing the ability to complex and retain a variety of molecules. It is believed that it is this unique ability of cyclodextrins to molecularly encapsulate compounds and then to release them in a controlled manner that make its presence in the pet food snack of the present invention unique. A crude preparation of a mixture of alpha, beta and gamma cyclodextrin is used in the pet food snack of the present invention as this mixture is more economical. The purified preparations of alpha, beta or gamma cyclodextrin can be used in the present invention; however, for practical reasons at the present time, the cost of doing so may be prohibitive.

The medications, vitamins, nutrients or supplements may be present in the puffed core matrix if these compounds or compositions are heat stable or alternatively they may be a present in the coating applied to the surface of the puffed core matrix. These medications, vitamins, nutrients or s supplements may be complexed with the cyclodextrin present in both the core matrix and coating. Alternatively, they may be present in either the core matrix and coating without being complexed with the cyclodextrin.

The medications which may be present in the core matrix and/or the coating should be of a sufficient amount to treat or to prevent diseases or illnesses in the pet receiving the pet food snack. Medications for the treatment of parasitic infestations, such as heartworms, tapeworms, hookworms, fleas, and ticks, may be present in the core matrix and/or the coating. Examples of medications which may be present in the puffed core matrix or present in the coating of the pet food snack of the present invention are pyrantel pamoate, pyrantel tartrate, piperazine adipate, piperazine hexanydrate, and piperazine tartrate for the treatment of heartworms. The core matrix or the coating of the pet food snack can function as a carrier for administering other known medications to treat or to prevent other diseases or illnesses in pets.

The vitamins, nutrients, and supplements which may be present in the core matrix and/or coating should be of a sufficient amount to maintain and to improve the health of pets. Examples of vitamins, nutrients and supplements which may be present in the puffed core matrix or present in the coating of the pet food snack of the present invention are thiamine hydrochloride, riboflavin, niacin, magnesium stearate, Vitamin D, brewer's dried yeast, garlic powder, and silicon dioxide. The core matrix or coating of the pet food snack can also function as a carrier for administering other known vitamins, nutrients and supplements known to maintain and to improve the health of pets.

Further, the core matrix contains an emulsifier which aids in the mixing of the components of the core matrix of the pet food snack of the present invention. An emulsifier, such as Myvaplex 600 made by Eastman Kodak or lecithin, may be used.

In addition to the foregoing matrix additives, effective amounts of antioxidant preservatives as normally used in the food industry can be used to make the core matrix. For example, one can utilize butylated hydroxytoluene (BHT), butylated hydroxyanisole (BHA), ethyoxyquin, or the like, in an amount sufficient to effect the desired antioxidant properties in the product, generally less than 1.0% by weight of the snack. Preferably, less than 0.1% by weight of the snack of these preservatives are utilized.

In addition to an antioxidant, one may also use an effective amount of an antimycotic as a preservative and mold inhibitor. Examples of such materials include the edible benzoates or propionates, such as sodium benzoate and calcium propionate, as well as sorbate salts, such as potassium sorbate, in an amount sufficient to prevent mold and bacterial growth within the product, each generally less than 1.0% by weight of the snack and preferably less than 0.1% by weight of the snack.

The table below provides an example of components by weight of the mixed dough, which can be mixed together to produce the pat snack food of the present invention:

a. corn meal or corn meal and other approx. 64–73%; above-identified substitutes
b. any one or a combination of:
  (1) bulgur wheat approx. 4–13%,
  (2) potato flour approx. 4–13%,
  (3) white sorghum flour approx. 4–7%,
  (4) peanut meal approx. 0.8–4.5%,
  (5) chick pea meal approx. 0.8–4.5%,
  (6) garbanzo bean meal approx. 0.8–4.5%,
  (7) wheat grits approx. 2–4.5%,
  (8) wheat gluten approx. 1–2%,
  (9) xanthan gum approx. 0.4–2.5%;
c. beef hide or other above-identified substitutes approx. 0.4–4.3%,
d. dry matrix flavoring ingredients matrix additives approx. 0.4–5%,
e. water+liquid matrix ingredients and additives approx. 15%, and
f. coating flavoring ingredients and matrix additives approx. 0.4–5%.

The above recited percentages represent a smaller percentage range of each component, except for water and the liquid matrix ingredients and additives, than the percentage range by weight of the finished snack. This is so because all of the liquid components constitute a total of approximately 15% by weight of all of the components in the resulting dough as compared to approximately 6–8% in the finished snack.

Referring now to FIG. 1, the pet food snack of the present invention is prepared by mixing the selected farinaceous materials except the corn meal from supply 4, the proteinaceous material from supply 6 and the dry matrix flavoring ingredients and additives from supply 8 to form a dry premix in mixer 10.

The corn meal from supply 12 is mixed with the liquid components from supply 14 which constitute approximately 15% by weight of all of the components in the final dough mixture to form a liquid corn meal mixture in mixer 16 and then the dry premix from mixer 10 is mixed with the liquid corn meal mixture in a vertical mixer 18 to produce a uniformly blended pasty dough. This dough is processed through an extruder 20 at approximately 250 RPMs, under heat at approximately 335–350° F. and under steam pressure to produce a porous, expanded, puffed mass which is bound together in the form of an extruded rope. The puffed mass in the form of an extruded rope is passed through a series of rotating knives 22 at approximately 50 RPMs, which cuts the mass to the desired shape; i.e., animal and bone-shaped and size of the resulting puffed core matrix. The moisture content in the puffed core matrix drops to approximately 6–8% within 1–2 minutes after extrusion.

The resulting pieces of puffed core matrix fall onto a conveyor belt 24 and are passed through an electrostatic coating device 26, which is commercially available and well known in the coating art. The coating device encapsulates the puffed core matrix with coating flavoring ingredients; such as, smoke flavoring, seasonings and spices and coating additives; such as cyclodextrin, vitamins, and optionally medications, nutrients or other supplements. After extrusion and during the process of passing through the electrostatic coating device, the temperature and moisture content of the puffed core matrix is reduced. These two actions result in the puffed core matrix itself creating a slight vacuum and facilitating the coating of the puffed core matrix by pulling the coating flavoring ingredients and coating additives onto the surface of the puffed core matrix, thus encapsulating the matrix resulting in the finished pet food snack of the present invention.

After the puffed core matrix has been encapsulated, it is dried, for example, by dropping it on a mesh belt 28 and passing air 30 from above downward through the pieces of encapsulated puffed core matrix on the belt. This drying step can be performed with heat or at ambient temperatures. The drying step can alternatively be simplified by laying the pieces of pet food snack out on drying tables. As result of drying, the pieces of pet food snack also cool. The dried cooled pet food snack is then packaged in sealed containers and stored for shipping.

The table below provides an example of preferred components with ranges by weight of the finished pet food snack of the present invention:

a. corn meal or corn meal and approx. 70–79%; other above-identified substitutes
b. any one or a combination of:
  (1) bulgur wheat approx. 4.5–14%,
  (2) potato flour approx. 4.5–14%,
  (3) white sorghum flour approx. 4.5–7.5%,
  (4) peanut meal approx. 0.9–4.7%,
  (5) chick pea meal approx. 0.9–4.7%,
  (6) garbanzo bean meal approx. 0.9–4.7%,
  (7) wheat grits approx. 1.9–4.7%,
  (8) wheat gluten approx. 0.9–1.9%,
  (9) xanthan gum approx. 0.4–2.8%,
c. beef hide or other above-identified substitutes approx. 0.4–4.7%, d. dry matrix flavoring ingredients and matrix additives approx. 0.4–5%;

e. water+liquid matrix ingredients and additives approx. 6–8%; and f. coating flavoring ingredients matrix additives approx. 0.4–5%.

A preferred pet food snack in the form of dry, puffed pieces of the present invention is a puffed core matrix containing corn meal, wheat grits, bulgur wheat, ground beef hide, matrix flavoring ingredients, cyclodextrin, an emulsifier, preservatives trace minerals, vitamins, and water, and then is encapsulated by coating the matrix with coating flavoring ingredients and additives.

The preferred finished pet food snack according to the present invention contains the following ingredients by weight of the finished snacks:

a. corn meal approx. 70–79%;

b. wheat grits approx 1.9–4.7%;

c. bulgur wheat approx. 4.5–14%;

d. beef hide approx. 0.4–4.7%;

e. matrix flavoring ingredients matrix additives approx. 0.5–5%;

f. water approx. 6–8%; and g. coating flavoring ingredients coating additives approx. 0.5–5%.

Although the pat food snack of the present invention has been described with specificity by examples with specific components and specific ranges of components, it will be apparent to those of ordinary skill in the art that many modifications or substitutions with comparable components may be made to the pet food snack and the method for making the snack which are suggested by the present invention and considered to be within the scope of the present invention.

We claim:

1. A method of preparing a dry, puffed pet food snack, comprising the steps of:

mixing farinaceous and proteinaceous dry ingredients with liquid to form a dough processing said dough through an extruder under heat and pressure to produce a heated puffed mass extruded as a rope, cutting the rope into puffed snack pieces, reducing the temperature and moisture content of the puffed extruded mass snack pieces, coating the pieces in a coating device with flavoring ingredients while the temperature and moisture content are being reduced thereby to facilitate the coating of the flavoring ingredients onto the puffed mass of the snack pieces, and passing air through the coated pieces after leaving the coating device to dry the pieces.

2. The method of claim 1 wherein the mixing step further comprises the two steps of mixing liquid ingredients with cornmeal to form a cornmeal-liquid mixture and forming a dough by the addition to the farinaceous and proteinaceous dry ingredients to the cornmeal-liquid mixture.

3. The method of claim 1 further comprising the step of: introducing corn meal into the dough to constitute in the order of 70–79% by weight of corn meal in the extruded snack pieces.

4. A method of preparing a dry, puffed pet food snack, comprising the steps of:

mixing farinaceous and proteinaceous dry ingredients and comprising between 70 and 79% by weight of corn meal with about 15% liquid to form a uniformly blended pasty dough with about 15% liquid content by weight.

processing said dough through an extruder under heat and pressure to produce a heated puffed mass extruded as a rope, cutting said extruded rope into shaped snack pieces; and coating the extruded heated snack pieces while reducing the temperature and moisture content in the presence of encapsulation flavoring ingredients.

5. The method of claim 4 further comprising the steps of:

drying and packaging the extruded and coated snack pieces in a sealed container for long term storage without refrigeration.

6. A method of preparing a dry, pet food snack, comprising the steps of:

(a) mixing together farinaceous material, except corn meal, proteinaceous material and matrix flavoring ingredients into a dry pre-mix;

(b) mixing corn meal with water and with matrixed flavoring ingredients and additives which are liquid to form a liquid-corn meal mixture;

(c) mixing the dry premix with said liquid-corn meal mixture to form a pasty dough;

(d) processing said dough through an extruder by heating and applying pressure to said dough and pushing said dough out of said extruder as a puffed mass;

(e) cutting said puffed mass being extruded with rotating knives to produce puffed pet food snack pieces;

(f) passing the puffed snack pieces through a coating device wherein the temperature and moisture content of the pieces is reduced to encapsulate said snack pieces with coating flavoring ingredients and coating additives; and (g) drying said encapsulated puffed pet food snack pieces by passing air through the encapsulated pieces to provide dry, puffed pet food snacks with a liquid content of about 6 to 8% by weight.

* * * * *